April 24, 1928.
O. F. WARHUS
1,666,921
DOUBLE TRUCK VEHICLE
Filed Aug. 30, 1924
2 Sheets-Sheet 1
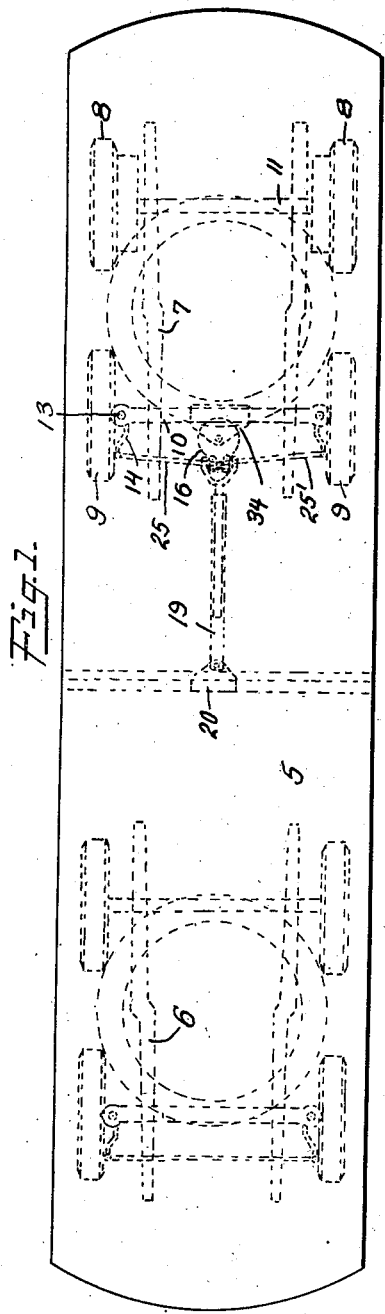
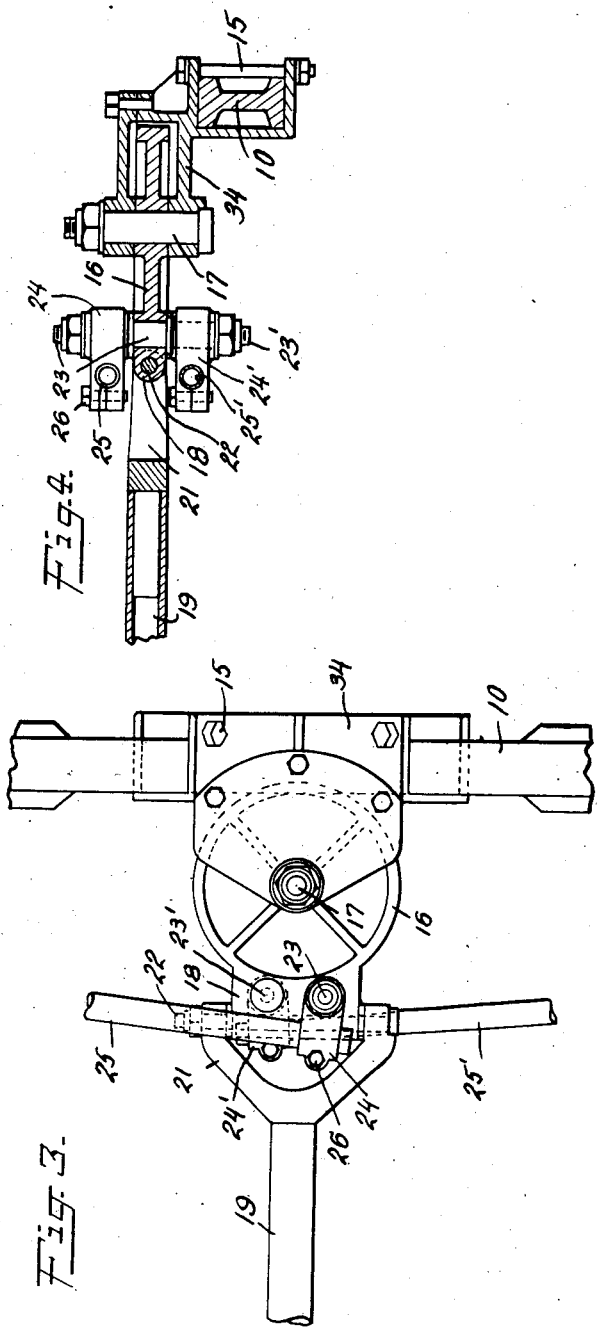
INVENTOR
Oliver Francis Warhus
BY
Pennie, Davis, Marvin + Edmonds
His ATTORNEYS

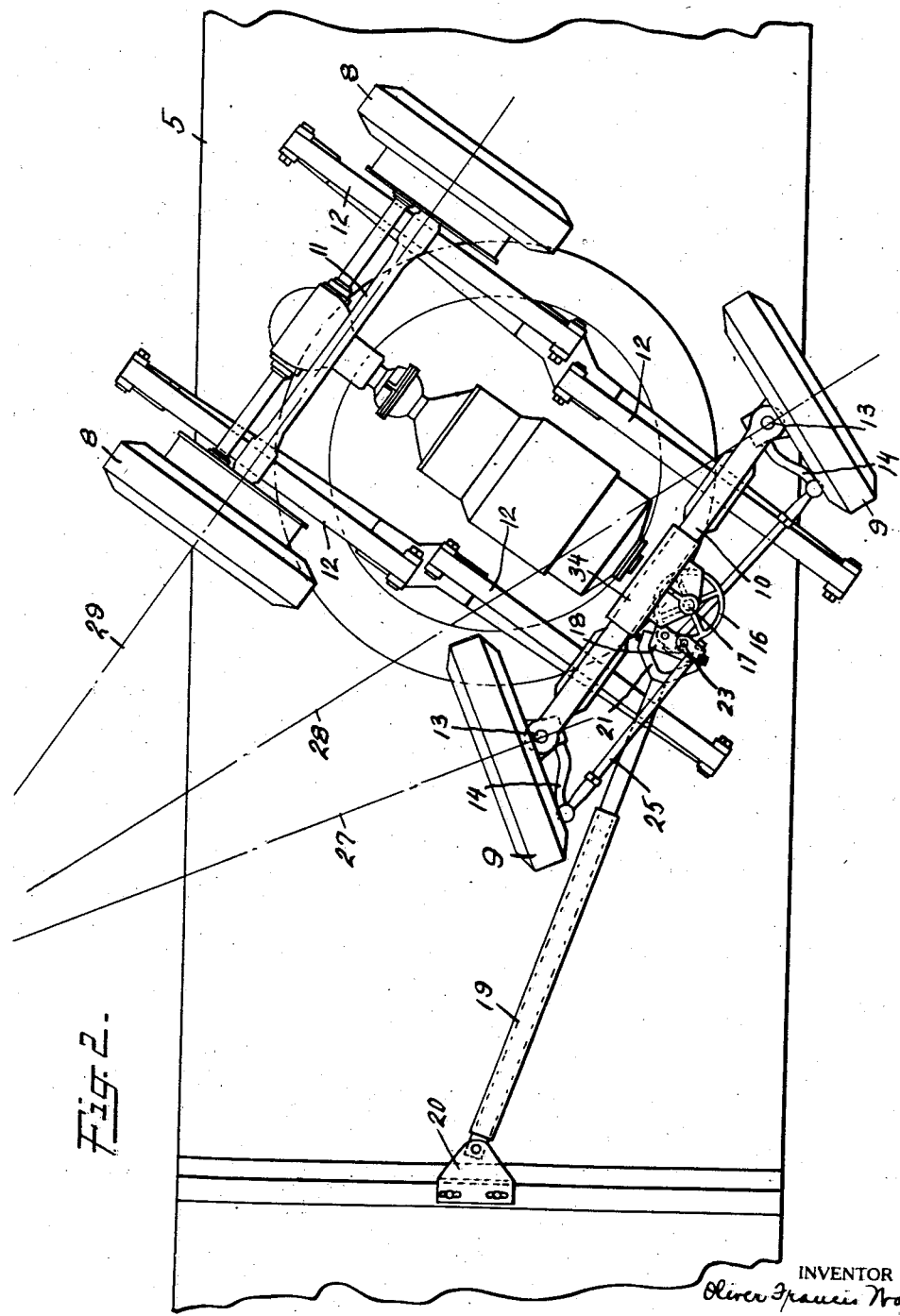

Patented Apr. 24, 1928.

1,666,921

UNITED STATES PATENT OFFICE.

OLIVER FRANCIS WARHUS, OF ALBANY, NEW YORK, ASSIGNOR, BY MESNE ASSIGNMENTS, TO VERSARE CORPORATION, A CORPORATION OF NEW YORK.

DOUBLE-TRUCK VEHICLE.

Application filed August 30, 1924. Serial No. 735,063.

This invention relates to vehicles of the type having a body pivotally mounted on two trucks. The invention involves the steering gear for such a vehicle, and relates in particular to the construction of the steering gear for the rear truck.

Vehicles have been made heretofore having forward and rear trucks, in which the rear truck is provided with front and rear wheels and mechanism for turning the front wheels of the rear truck actuated by a connection to those wheels from the body of the vehicle, the construction being such that when the longitudinal axis of the body is shifted angularly, the lateral movement of a portion of the body operates through the connection to the front wheels of the rear truck to turn them about substantially vertical axes. In vehicles of this type, as heretofore made, the front wheels of the rear truck have been mounted on the truck to turn about substantially vertical axes and have been connected by a tie rod, to which the connection to the body of the vehicle is secured. With such a construction, the two front wheels of the rear truck are turned angularly the same amount in steering the vehicle, and when these wheels are turned in this way, slippage of one or both of the wheels is inevitable. To avoid such slippage, the two front wheels of the rear truck should be turned angularly different amounts, and these amounts should be such that the prolongations of the axes of rotation of the two front wheels would meet in the line of prolongation of the axis about which the two rear wheels turn.

The present invention is directed to the provision of an improved construction for effecting the turning movement of the two front wheels of the rear truck, whereby those two wheels will be turned through different amounts bearing a predetermined relation, such that slippage will be avoided.

In the present instance this is effected by the provision of a rotatable member upon the frame of the rear truck, a connection from that member to the body of the vehicle, and connections from that member to the two front wheels of the rear truck, these latter connections being so constructed and arranged that when the rotatable member is turned about its pivot the two wheels will be turned through different amounts, the wheel on the inside of the curve of the vehicle's track being turned about its pivot a greater amount than the wheel on the outside of the curve. When this is done, the two front wheels of the rear truck will always be turned together, but will be turned through different amounts bearing a prescribed relation, such that the prolongations of the axes of rotation of these front wheels will meet at a point in the line of prolongation of the axis of rotation of the two rear wheels.

A construction embodying the invention is illustrated in the accompanying drawings, in which Fig. 1 is a plan view of a double truck vehicle, Fig. 2 is an enlarged view of the rear truck, looking upward at the bottom of the truck and the vehicle body, Fig. 3 is a plan view of a portion of the connecting mechanism from the vehicle body to the front wheels of the rear truck, and Fig. 4 is a detail view in section of the parts shown in Fig. 3.

Referring to these drawings, the body of the vehicle is shown at 5 and it is pivotally mounted upon a front truck 6 and a rear truck 7. These two trucks may be of any suitable construction and may have any desired number of pairs of wheels, the only essential, so far as this invention is concerned, being that the rear truck shall have front wheels and rear wheels and shall have its front wheels mounted for turning movement about two substantially vertical axes. In the present instance the rear truck is shown as having a pair of rear wheels 8 and a pair of front wheels 9, these being mounted on front and rear axles 10 and 11, suitable springs 12 being provided, as is usual in such truck structures. The front wheels 9 are pivotally connected to the front axle 10 to turn about substantially vertical axes, 13. The pivoted member of each front wheel 9 is provided with a crank arm 14 by which turning movement of the wheel about its pivotal axis 13 is effected.

The front axle 10 has a supporting member or housing 34 secured thereto by means of bolts 15, and this housing 34 forms a pivotal support for a rotatable member 16, a bolt 17 passing through the housing 34 and the member 17 serving as a pivot about which the member 16 turns. This member 16 is shown in the drawings as having the form of a wheel with an integral projection 18 at its forward edge. This rotatable member 16 is connected to the bottom of the body 5 of the vehicle by means of a connection 19 which is formed in two parts, one telescoping more or less within the other. One end of this connection is secured to the car body at 20, and the opposite end of the connection is bifurcated, as shown at 21, and secured to the projection 18 of the rotatable member 16 by means of a pivot pin 22.

The rotatable member 16 is connected at points on opposite sides of its center line to the two front wheels 9 of the rear truck. A stud 23 is mounted on the upper face of the projection 18 and forms a pivotal support for a clamping member 24, whose outer end is split and is provided with an opening to receive one end of a connecting bar 25 which is clamped in the opening by tightening the bolt 26 passing through the split end of the clamp 24. The opposite end of the connecting bar 25 is pivotally connected to the outer end of the crank arm 14 of one of the front wheels 9 of the truck. It will be noted that this stud 23 is mounted on the projection 18 a short distance to one side of the center line of the projection and the rotatable member 16.

On the bottom of the projection 18 and an equal distance on the other side of the center line of the rotatable member 16, is a similar stud 23', on which a clamp 24' is pivotally mounted, and from this clamp a similar bar 25' extends to the crank arm 14 of the other front wheel 9.

The manually controlled steering mechanism of the car operates to turn the front truck or the front wheels of that truck, and when that is done while the vehicle is moving forwardly, the direction of the center line of the vehicle body is changed as a result of lateral movement of the forward portion of the body. This moves the end 20 of the connection 19 laterally and the connection 19 operates to turn the rotatable member 16 about its pivot 17. When this member 16 is so turned, it operates through the studs 23, clamps 24, bars 25, and cranks 14 to turn the front wheels 9 of the rear truck about their substantially vertical axes 13, but it will be noted that these connections are such that the two wheels 9 will not be turned the same amount. This results from the fact that the studs 23 and 23' of the two bars 25 and 25' are at different points about the circumference of the rotatable member 16, and though these two studs move through the same arcs, the positions of those two arcs about the axis 17 of the member 16 are different, and as a result the movement of the parts controlling one front wheel is more effective in causing turning movement of that wheel than that of the parts for the other wheel.

Fig. 2 shows the wheels of the rear truck turned to an extreme position. When lateral movement of the portion of the car body to which the member 19 is connected at 20, occurs, the front wheels 9 of the rear truck are turned angularly different but corresponding amounts, and as the vehicle moves forward with these wheels so turned, the rear truck turns as a whole about its pivotal connection to the car body, and the parts are shown in this relation in Fig. 2. This figure also illustrates the different amounts of the turning movement of the two front wheels 9 for the axis of rotation of these two wheels are shown in dot and dash lines. It will be noted that these two lines 27 and 28 converge, instead of being parallel as they would be if the two front wheels were turned through equal angles. Also, these two lines 27 and 28 meet at a point in the line 29 which is a prolongation of the axis of the rear wheels 8, and when the construction is such that these two lines 27 and 28 converge and meet in the line 29 on the side of the vehicle on the inside of the curve about which the vehicle is traveling, there will be no slippage of the front wheels 9 of the rear truck. With this construction the two front wheels 9 of the rear truck are always turned together, but at varying rates, depending upon the angular relation of the car body to the rear truck existing at the time, and at all times the angular relation will be such that the prolongation of their axes of rotation will meet in the prolongation of the axis of rotation of the rear wheels.

In the foregoing description, and in the annexed drawings, I have shown and described the construction which I prefer to employ in practicing my invention, but I wish it understood that the invention may be employed in constructions varying over wide limits. It is essential only that the rear truck of the vehicle have the body pivotally mounted thereon and have front wheels which may be turned angularly about substantially vertical axes, and that there be a connection from the car body to these front wheels, such that when relative angular movement of the body and the rear truck takes place, the two front wheels of the rear truck shall be turned angularly about their substantially vertical axes different but corresponding amounts. This can be effected readily, and, so far as I am now aware, most conveniently, by utilizing a rotatable member on the rear truck connected in some convenient manner to the body, and also connected by separate and distinct connecting means to the two front wheels, the particular form of these connections to the front wheels being such that angular movement of this rotatable member about its pivot is more effective upon one of the front wheels than upon the other. The relative effect of turning movement of this rotatable member upon each of the two front wheels varies constantly as movement takes place, and is different for all different positions of the rotatable member, but the result is to effect a differential turning movement of these two front wheels, such that the one on the inside of the curve will always be turned the greater amount, and the two will always be in the correct relation for carrying the vehicle around a curve without undue slippage of one or both of the wheels upon the ground.

While the improved steering mechanism has been illustrated and described in connection with the rear truck, it is obvious that that part of the mechanism which effects differential turning movement of the front wheels of the rear truck is also applicable to the front wheels of the front truck to effect differential turning movement of those wheels also. When the mechanism is so used the connection 19 may be replaced by any suitable manually controlled means for actuating the rotatable member 16.

I claim:

1. A vehicle having a body, a rear bogie truck having front and rear wheels on which the rear portion of the body is pivotally mounted, the front wheels of the truck being pivotally mounted on the truck to turn about two separate substantially vertical axes, a steering member pivotally connected at its forward end to the body at a point on the body forward of the truck and pivotally connected at its rear end to the truck at a point on the truck forward of the pivotal connection of the truck to the body, whereby lateral movement of the forward end of the body causes the forward end of the member to be moved laterally and the rear end to turn relatively to the truck about a vertical axis, and transverse members connected to the said steering member, the outer ends of the said transverse members being connected to the front wheels of the truck, and the inner ends of these members being arranged to vary their longitudinal relation as the steering member is actuated for turning the wheels about their vertical pivotal connections to the truck differential amounts when the forward end of the body moves laterally and the body turns relatively to the truck.

2. A vehicle having a frame, a rear bogie truck having front and rear wheels on which the rear portion of the frame is pivotally mounted, the front wheels of the truck being pivotally mounted to turn about substantially vertical axes, a steering member connected at its forward member to the frame at a point forward of the truck so as to have angular movement relative to the frame as the vehicle is turned, a rotatable member secured adjacent the front wheels on the truck, connections between the steering member and the rotatable member whereby the latter is rotatable according to the angular movement of the former, and transverse members connected to the opposite front wheels and by their inner ends to the rotatable member, the inner ends of said transverse members being spaced apart and extending past each other, this relation being adapted to move the front wheels through varying angles according to the angle assumed by the steering member with respect to the body as the vehicle is turned.

In testimony whereof I affix my signature.

OLIVER FRANCIS WARHUS.